(12) United States Patent
Twork

(10) Patent No.: US 8,474,861 B1
(45) Date of Patent: Jul. 2, 2013

(54) INTERIOR PANELS HAVING INTEGRATED AIRBAG DEPLOYMENT DOORS FOR MOTOR VEHICLES AND METHODS FOR MAKING THE SAME

(75) Inventor: Michael Twork, White Lake, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/432,280

(22) Filed: Mar. 28, 2012

(51) Int. Cl.
*B60R 21/20* (2011.01)
*B60R 21/215* (2011.01)

(52) U.S. Cl.
USPC ............... 280/728.3; 280/732; 280/743.1

(58) Field of Classification Search
USPC ............... 280/728.3, 731, 732, 743.1
See application file for complete search history.

(56) References Cited

U.S. PATENT DOCUMENTS

| | | | |
|---|---|---|---|
| 6,142,520 A | 11/2000 | Iino et al. | |
| 6,623,029 B2* | 9/2003 | Sun et al. | 280/728.2 |
| 7,140,636 B2* | 11/2006 | DePue et al. | 280/732 |
| 7,234,726 B2 | 6/2007 | Trevino et al. | |
| 7,464,958 B2* | 12/2008 | Kong | 280/728.3 |
| 7,484,752 B2 | 2/2009 | Yasuda et al. | |
| 7,556,284 B2* | 7/2009 | Riha et al. | 280/728.3 |
| 7,806,430 B2* | 10/2010 | Cowelchuk et al. | 280/728.3 |
| 7,828,323 B1* | 11/2010 | Mazzocchi et al. | 280/732 |
| 8,181,987 B2* | 5/2012 | Mazzocchi et al. | 280/728.3 |
| 8,336,908 B1* | 12/2012 | Kalisz et al. | 280/728.3 |
| 2005/0127641 A1* | 6/2005 | Cowelchuk et al. | 280/728.3 |
| 2006/0033313 A1* | 2/2006 | Horiyama | 280/728.3 |
| 2007/0246918 A1* | 10/2007 | Speelman et al. | 280/728.3 |
| 2008/0073885 A1* | 3/2008 | Cowelchuk et al. | 280/728.3 |
| 2010/0207366 A1* | 8/2010 | Evans et al. | 280/728.3 |

FOREIGN PATENT DOCUMENTS

JP 2007076393 A 3/2007

* cited by examiner

*Primary Examiner* — Joseph Rocca
*Assistant Examiner* — Darlene P Condra
(74) *Attorney, Agent, or Firm* — Ingrassia Fisher & Lorenz, P.C.

(57) ABSTRACT

Interior panels having integrated airbag deployment doors for motor vehicles, and methods for making such interior panels are provided herein. In one example, an interior panel comprises a substrate that comprises a first PP/TPO material. An airbag chute-door assembly comprises a chute portion that has a chute wall. The chute wall at least partially surrounds an interior space that is sized to permit passage of an airbag during deployment. A first door flap portion is disposed adjacent to the interior space. The first door flap portion comprises a first door flap section and at least one first weld feature. The at least one first weld feature comprises a second PP/TPO material and attaches the first door flap section to the substrate. A first hinge pivotally connects the first door flap section to the chute portion. The first hinge comprises a TPE material.

13 Claims, 5 Drawing Sheets

INTERIOR PANELS HAVING INTEGRATED AIRBAG DEPLOYMENT DOORS FOR MOTOR VEHICLES AND METHODS FOR MAKING THE SAME

TECHNICAL FIELD

The present invention relates generally to interior panels structured for inflatable restraints for motor vehicles, and more particularly to interior panels having integrated airbag deployment doors for motor vehicles and methods for making such interior panels.

BACKGROUND

Motor vehicles often include an inflatable restraint apparatus having a deployable airbag positioned in or behind an interior vehicle panel, such as an instrument panel, door panel, and the like. Many interior panels include an integrated deployment door formed into the interior panel that is designed to break free upon deployment of the airbag. Controlling the opening of the deployment door is desirable for providing a clean deployment, e.g., minimal or no fragmentation, of the airbag through the interior panel. Often an area of the interior panel surrounding the deployment door is scored or pre-weakened, e.g., via laser scoring, mechanical scoring, or the like, to form a seam that facilitates a clean airbag deployment. Additionally, supporting structures behind the interior panel can be attached to the deployment door to further control the opening of the deployment door.

In one example disclosed in U.S. Pat. No. 7,484,752, issued to Yasuda et al., an instrument panel is molded from a relatively hard and high melting point polypropylene (PP) material. A fragile splitting contour is formed into a rectangular shape along the backside of the instrument panel to define a door section that opens during airbag deployment. An airbag apparatus containing an airbag is mounted to reinforcing members and an airbag supporting frame. The reinforcing members and the airbag supporting frame are made from a relatively soft and low melting point thermoplastic material and are welded to the backside of the instrument panel along and around the door section. During airbag deployment, the airbag expands towards the door section, pushing the door section open to permit the airbag to unfold outside of the instrument panel. The soft and low melting point thermoplastic material that forms the reinforcing members and the airbag supporting frame is relatively compliant, which helps to absorb energy and control movement during airbag deployment, but the material inherently has lower mechanical properties than the hard PP material that forms the instrument panel. Moreover, it has been found that the weld strength between the soft thermoplastic material and the hard PP material is often marginal. As such, the reinforcing members and the airbag support frame can unfortunately partially or fully separate from the door section during airbag deployment, which can reduce control over the opening of the door section and result in a less clean airbag deployment.

Accordingly, it is desirable to provide interior panels having integrated airbag deployment doors for motor vehicles with improved control over the opening of the deployment door to provide a clean airbag deployment, and methods for making such interior panels. Furthermore, other desirable features and characteristics of the present invention will become apparent from the subsequent detailed description and the appended claims, taken in conjunction with the accompanying drawings and this background.

BRIEF SUMMARY

Interior panels having integrated airbag deployment doors for motor vehicles, and methods for making such interior panels are provided herein. In accordance with an exemplary embodiment, an interior panel having an integrated airbag deployment door for a motor vehicle comprises a substrate that comprises a first PP/TPO material. A PP/TPO material is a material that contains polypropylene (PP) and/or thermoplastic olefin (TPO). An airbag chute-door assembly comprises a chute portion that has a chute wall. The chute wall at least partially surrounds an interior space that is sized to permit passage of an airbag during deployment. A first door flap portion is disposed adjacent to the interior space. The first door flap portion comprises a first door flap section and at least one first weld feature. The at least one first weld feature comprises a second PP/TPO material and attaches the first door flap section to the substrate. A first hinge pivotally connects the first door flap section to the chute portion. The first hinge comprises a thermoplastic elastomeric material (TPE material) that has a different composition than the first and second PP/TPO materials.

In accordance with another exemplary embodiment, a method of making an interior panel having an integrated airbag deployment door for a motor vehicle is provided. The method comprises the steps of positioning a chute portion and a first door flap section of an airbag chute-door assembly adjacent to a substrate that comprises a first PP/TPO material. At least one weld feature comprising a second PP/TPO material is welded to the substrate to attach the first door flap section to the substrate. The first door flap section is pivotally connected to the chute portion by at least one hinge. The at least one hinge comprises a TPE material that has a different composition than the first and second PP/TPO materials.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
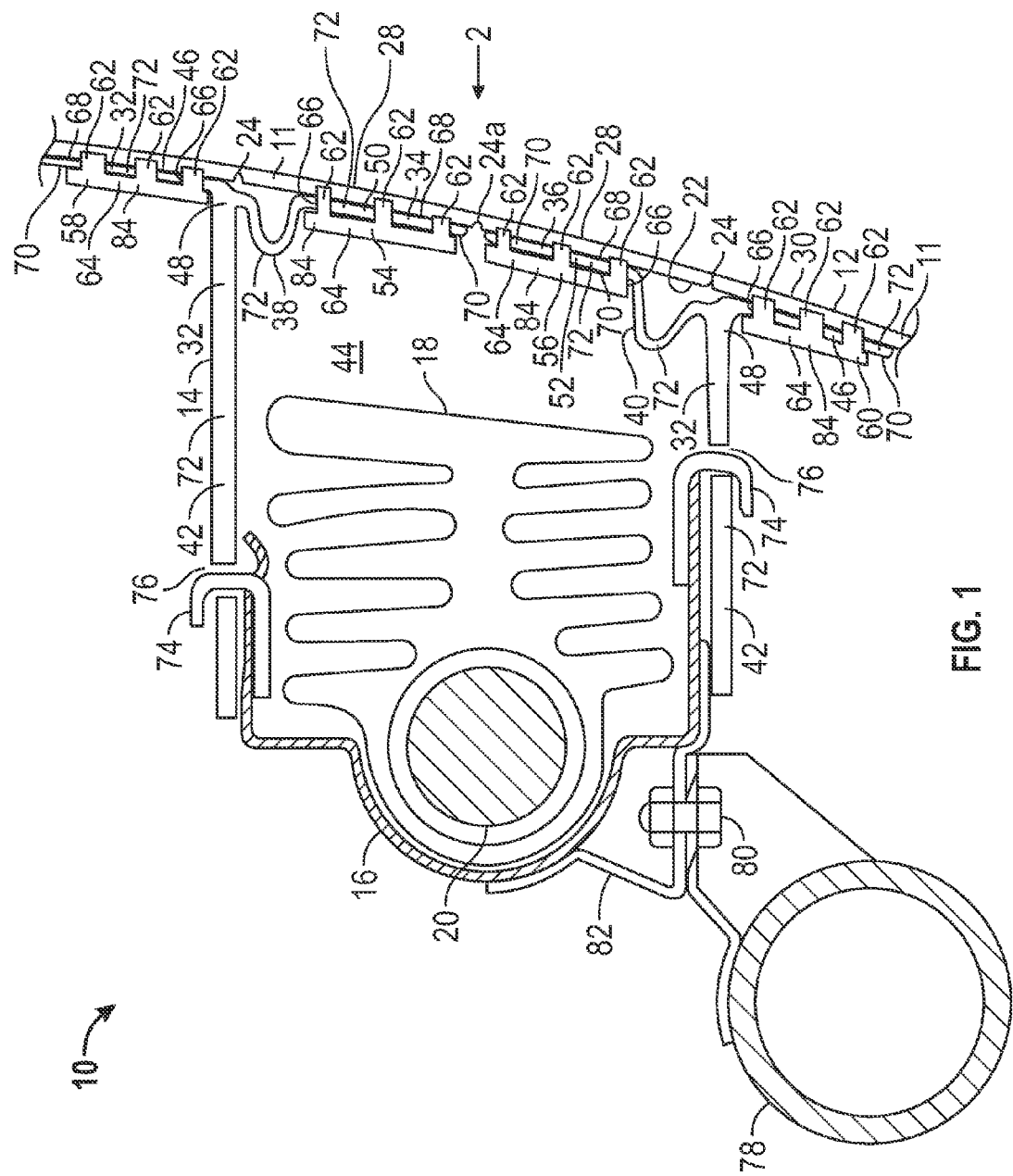
FIG. 1 is a vertical sectional view of an interior panel for a motor vehicle including a substrate and an airbag chute-door assembly in accordance with an exemplary embodiment.

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to interior panels having integrated airbag deployment doors for motor vehicles, and methods for making such interior panels. The exemplary embodiments taught herein provide an interior panel comprising a substrate that is formed of a first PP/TPO material. As used herein, the term "PP/TPO material" refers to a material that contains polypropylene (PP) and/or thermoplastic olefin (TPO). As will be discussed in further detail below, in one example, the substrate is an interior vehicle instrument panel substrate and the first PP/TPO material is a grade of PP/TPO material that has relatively high mechanical properties, e.g., relatively high flexural modules and the like, and is suitable for forming instrument panel substrates. In an exemplary embodiment, the substrate has an integrated airbag deployment door that is defined by a seam formed by scoring, e.g., pre-weakening, the backside of the substrate.

An airbag chute-door assembly is welded to the backside of the substrate including to the backside of the integrated airbag deployment door. The airbag chute-door assembly performs multiple functions including positioning and securing an airbag module that contains a deployable airbag, reinforcing the integrated airbag deployment door, and helping to control the opening of the integrated airbag deployment door to provide a clean airbag deployment. The airbag chute-door assembly is constructed of both a thermoplastic elastomeric/elastomer (TPE) material and a second PP/TPO material. As will be discussed in further detail below, the TPE material is relatively compliant, e.g., relatively low flexural modulus with relatively high elongation and elasticity, to help absorb energy and control movement during airbag deployment. In an exemplary embodiment, the first and second PP/TPO materials have the same or essentially equivalent compositions. As used herein, the term "the same or essentially equivalent composition" means that the composition of the two materials is the same, or the two materials are the same grade or equivalent grades of PP/TPO material that differ in composition within typical compounding/manufacturing tolerances, or the two materials are similar grades of PP/TPO material that differ in composition within typical compounding/manufacturing tolerances and/or by minor ingredients that add up to about 5 weight percent (wt. %) or less of the total composition. As such, the first and second PP/TPO materials have similar physical properties including melting point, mechanical properties including flexural modulus, and processing properties including melt flow and welding properties. It has been found that welding two such similar PP/TPO materials together provides a robust welding process that produces weld joints with relatively high weld strength.

In an exemplary embodiment, the airbag chute-door assembly comprises a chute portion and at least one door flap portion. The chute portion has a chute wall that at least partially surrounds an interior space. Attached to the chute wall and adjacent to the interior space is the airbag module. The interior space is sized to permit the airbag to pass through the interior space towards the integrated airbag deployment door during deployment. The door flap portion is positioned along the backside of the integrated airbag deployment door adjacent to the interior space. The door flap portion comprises a door flap section and at least one weld feature, such as a rib(s), boss(es), or other positive feature(s). The weld feature(s) is formed of the second PP/TPO material and is welded to the integrated airbag deployment door that is formed of the first PP/TPO material to secure the door flap section to the backside of the integrated airbag deployment door. Because the first and second PP/TPO materials are similar materials, the weld strength between the door flap portion and the integrated airbag deployment door is relatively high to improve control over the opening of the integrated airbag deployment door (e.g., reducing, minimizing, or eliminating delamination between the door flap portion and the integrated airbag deployment door) for a clean airbag deployment.

A hinge pivotally connects the door flap section to the chute portion. The hinge is formed of the TPE material. Additionally, other portions of the airbag chute-door assembly can be selectively formed of the TPE material, such as, for example, the door flap section, chute wall, or portions of the chute wall that attach to the airbag module. As such, the hinge and other portions of the airbag chute-door assembly will be relatively compliant to help absorbed energy and control movement (e.g., opening of the integrated airbag deployment door) during airbag deployment.

Figure 2:
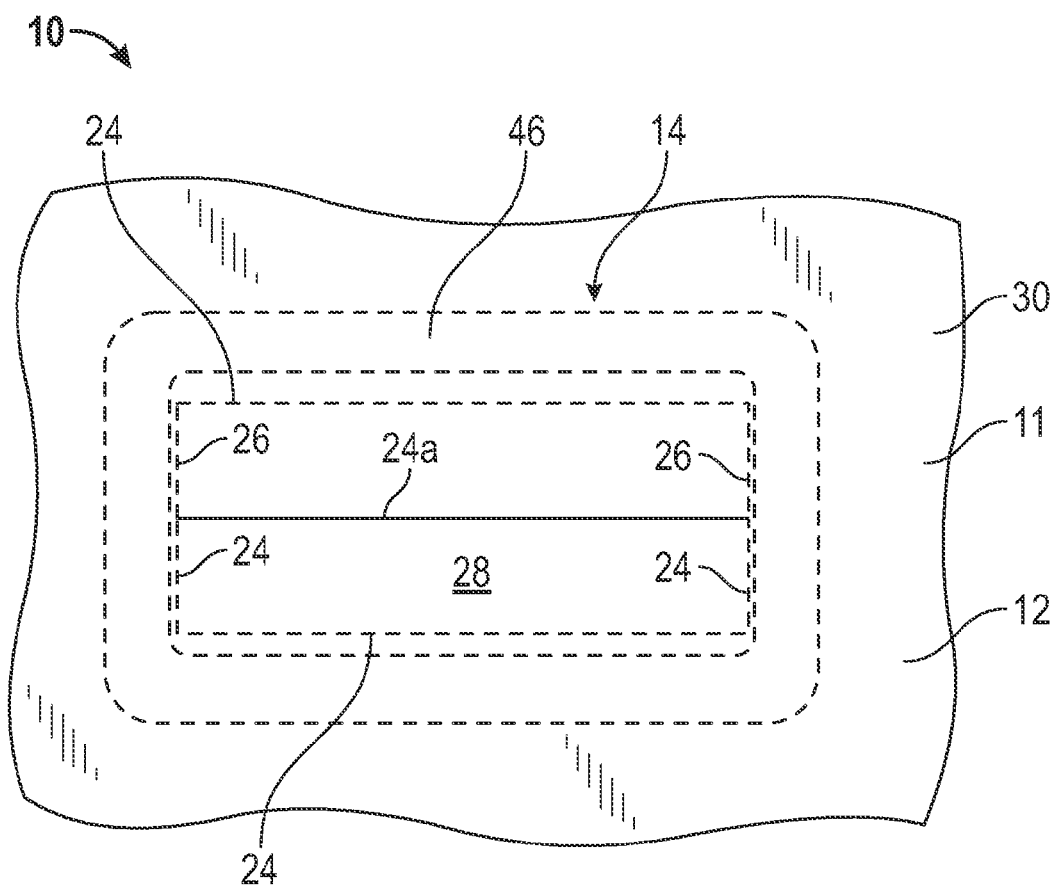
FIG. 2 is a plan view of a portion of the interior panel depicted in FIG. 1 from the direction indicated by arrow 2.

FIG. 1 is a vertical sectional view of an interior panel 10 in accordance with an exemplary embodiment. FIG. 2 is a plan view of a portion of the interior panel 10 depicted in FIG. 1 from the direction indicated by arrow 2. In an exemplary embodiment, the interior panel 10 is an instrument panel that can be positioned forward of a driver seat and a front passenger seat of a motor vehicle. As such, FIGS. 1 and 2 depict views of the interior panel 10 forward of the front passenger seat. Alternatively, the interior panel 10 can be a door panel or other interior vehicle trim panel. As illustrated, the interior panel 10 comprises a substrate 11, an airbag chute-door assembly 14, and an airbag module 16 that contains a deployable airbag 18 and an inflator 20.

The substrate 11 is formed of a PP/TPO material 30. In an exemplary embodiment, the PP/TPO material 30 is a material that comprises PP and/or TPO as the primary component(s). In addition to PP and/or TPO, the PP/TPO material 30 may also comprise one or more other ingredients, such as rubber, fillers such as talc and the like, impact modifiers, stabilizers, processing additives and/or mold release agents, reinforcing fibers such as glass fibers, natural fibers, and the like, anti-scratch additives, pigments and/or molded-in-color additives, adhesion promoters, recycled product, and the like. Other ingredients known to those skilled in the art may also be included in the PP/TPO material 30. In an exemplary embodiment, the PP/TPO material 30 is a grade of PP/TPO material that has relatively high mechanical properties including a flexural modulus at 23° C. of at least about 1500 MPa, such as from about 1500 to about 3000 MPa, for example from about 1600 to about 2600 MPa, and is suitable for forming instrument panel substrates. Non-limiting examples of instrument panel substrate grade PP/TPO materials are ATX832™, ATX880™, and ATX639™ manufactured by Advanced Composites, Inc., located in Sydney, Ohio. Many other suitable grades of PP/TPO materials are also commercially available from various other suppliers.

The outer surface 12 of the substrate 11 can be a hard decorative surface, such as a mold-in-color surface, a painted surface, or the like. Alternatively, the outer surface 12 can be covered by foam and skin, such as in well known foam-in-place or tri-laminate constructions, to provide a "soft instrument panel."

The back surface 22 of the substrate 11 is scored or pre-weakened to define a seam 24 that forms a rectangular shape that is long in the horizontal direction. A center seam 24a extends between lateral sides 26 to divide the rectangular shape, forming an "H-pattern." The seams 24 and 24a define an integrated airbag deployment door 28 that separates from the substrate 11 along the seams 24 and 24a and that opens in a bi-parting manner to permit the airbag 18 to unfold and inflate outside of the interior panel 10 to facilitate a clean airbag deployment. Alternatively, the back surface 22 of the substrate 11 may be scored or pre-weakened to define the seam 24 without the center seam 24a to form a "U-pattern." Other patterns and seam configurations for pre-weakening the substrate 11 to form an integrated airbag deployment door known to those skilled in the art may be used.

In an exemplary embodiment, the seams 24 and 24a are formed using a laser scoring process. In one example, the seams 24 and 24a are formed by radiating a laser beam having a beam diameter of from about 0.1 to about 0.5 mm and a wavelength of about 10.6 µm onto the back surface 22 of the substrate 11 to create dot-like slit pores having a depth that partially penetrates the substrate 11. Alternatively, the seams 24 and 24a may be formed using mechanical scoring or any other substrate pre-weakening process known to those skilled in the art.

Attached to the back surface 22 of the substrate 11 is the airbag chute-door assembly 14. The airbag chute-door assembly 14 comprises a chute portion 32, door flap portions 34 and 36, and hinges 38 and 40 that pivotally connect the door flap portions 34 and 36, respectively, to the chute portion 32. In an exemplary embodiment, the door flap portions 34 and 36 are configured as a "H-pattern" door arrangement that helps the integrated airbag deployment door 28 to open in a bi-parting manner to facilitate a clean airbag deployment. Alternative door arrangements, such as a "U-pattern" door arrangement (e.g. with only a single door flap) or the like, known to those skilled in the art may be used. The chute portion 32 has a chute wall 42 that at least partially surrounds an interior space 44. The interior space 44 is sized to permit passage of the airbag 18 towards the door flap portions 34 and 36 and the integrated airbag deployment door 28 during airbag deployment. Attached to the chute wall 42 is the airbag module 16 that accommodates the airbag 18 in a folded state. As shown, the airbag module 16 has a plurality of hooks 74 that project outwardly through chute wall openings 76 to engage the chute wall 42. The airbag module 16 is attached to a cross member 78 by a bolt and nut 80 via a supporting member 82.

The door flap portions 34 and 36 comprise door flap sections 50 and 52 and inserts 54 and 56, respectively, that are disposed adjacent to the corresponding door flap sections 50 and 52. In an exemplary embodiment, the hinges 38 and 40 are integrally connected to the door flap sections 50 and 52, respectively, and the chute wall 42 to define "living hinges." The chute portion 32 comprises the chute wall 42, a perimeter flange 46 that extends from an end portion 48 of the chute wall 42 away from the interior space 44, and inserts 58 and 60 that are disposed adjacent to the perimeter flange 46.

In an exemplary embodiment and as illustrated, the door flap sections 50 and 52, the hinges 38 and 40, the chute wall 42, and the perimeter flange 46 are formed of a TPE material 72 that has a different composition than the PP/TPO material 30. The TPE material 72 is elastomeric and relatively compliant, and has a relatively high elongation over a wide range of temperatures (e.g., from about −30° C. to about 115° C.) and ductility at cold temperatures (e.g., about −30° C.). The TPE material 72 can be a thermoplastic material that comprises a styrenic component, an olefinic component, a urethane component, a copolyester component, or combinations thereof. Alternatively, the TPE material 72 can be a thermoplastic vulcanizate (TPV). In an exemplary embodiment, the TPE material 72 has a relatively high elongation at 23° C. of about 25% or greater, such as from about 25% to about 500%, for example from about 50% to about 300%. In an exemplary embodiment, the TPE material 72 has a relatively low flexural modulus at 23° C. of about 1,000 MPa or less, such as about 500 MPa or less, for example from about 1 MPa to about 100 MPa. The TPE material 72 helps the door flap sections 50 and 52, the hinges 38 and 40, the chute wall 42, and the perimeter flange 46 to absorb energy and control movement of the integrated airbag deployment door 28 and the airbag module 16 during airbag deployment. Non-limiting examples of suitable TPE materials include various grades of HIPEX® and Thermolast® TPEs manufactured by Kraiburg TPE Corporation, located in Duluth, Ga. Many other suitable TPE materials are also commercially available from other suppliers.

Figure 3:
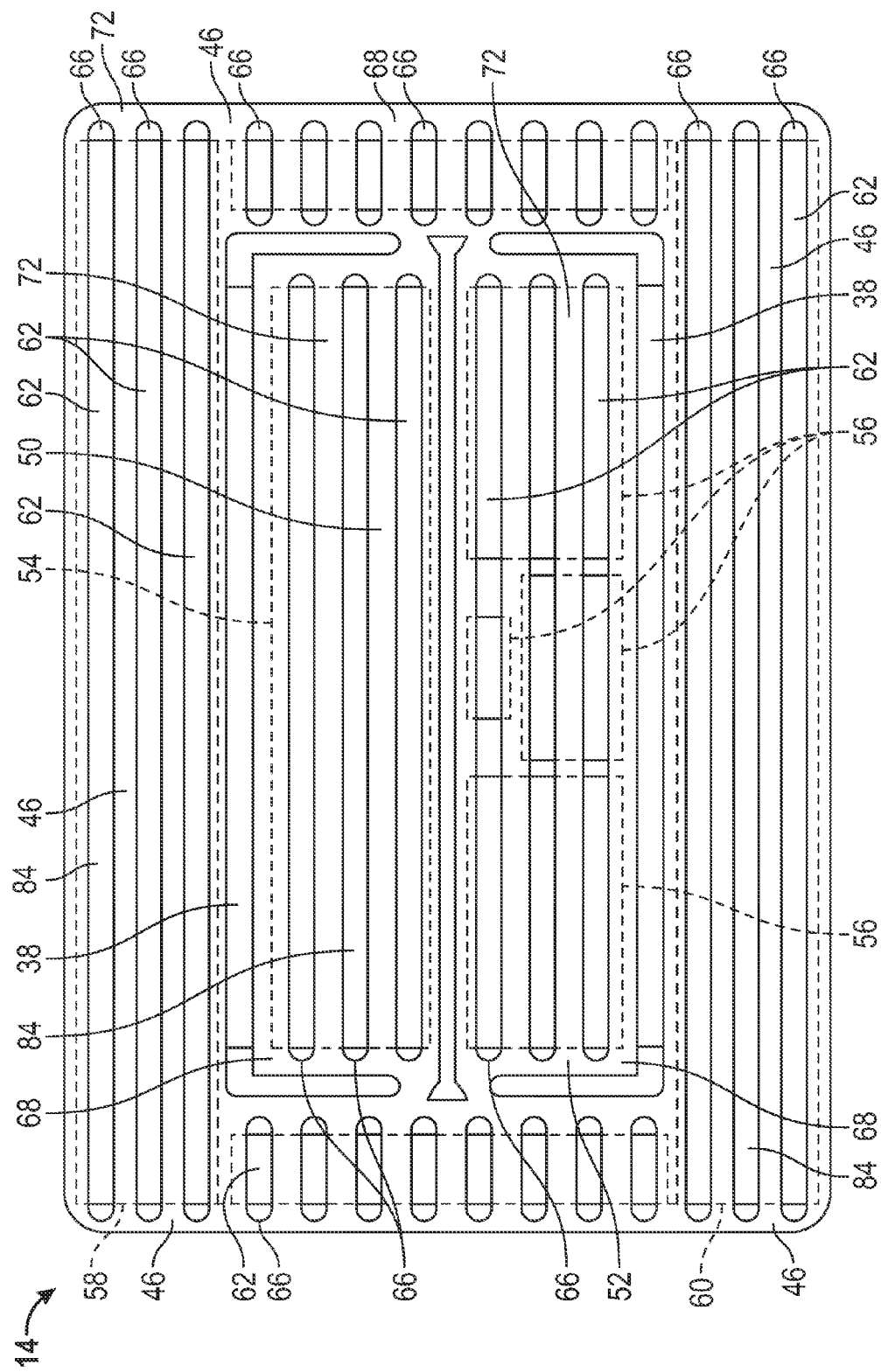
FIG. 3 is a plan view of the airbag chute-door assembly depicted in FIG. 1 from the direction indicated by arrow 2.

Referring also to FIG. 3, a plan view of the airbag chute-door assembly 14 depicted in FIG. 1 from the direction indicated by arrow 2 is provided. In an exemplary embodiment, a plurality of weld features 62 extend from base portions 64 of the inserts 54, 56, 58, and 60. The perimeter flange 46 and the door flap sections 50 and 52 have a plurality of openings 66 formed therethrough extending from substrate facing surfaces 68 to back surfaces 70 of the perimeter flange 46 and the door flap sections 50 and 52, respectively. In an exemplary embodiment, the openings 66 are configured as slots that are long in the horizontal direction and the weld features 62 are configured as ribs that are long in the horizontal direction. The openings 66 configured as slots and the weld features 62 configured as ribs advantageously help to simplify the positioning and assembly of the inserts 54, 56, 58, and 60 along the perimeter flange 46 and the door flap sections 50 and 52 during manufacturing.

In an exemplary embodiment and as illustrated, the base portions 64 of the inserts 54 and 56 are disposed along the back surfaces 70 of the door flap sections 50 and 52, respectively, and the weld features 62 of the inserts 54 and 56 extend through the openings 66 to position the weld features 62 adjacent to and proud of the substrate facing surfaces 68 of the door flap sections 50 and 52. The weld features 62 of the inserts 54 and 56 are welded, e.g., via vibration welding, ultrasonic welding, or the like, to the back surface 22 of the integrated airbag deployment door 28. As such, the door flap sections 50 and 52 are sandwiched between the base portions 64 of the inserts 54 and 56, respectively, and the substrate 11 to operatively couple the door flap sections 50 and 52 to the integrated airbag deployment door 28. This arrangement helps to reinforce the integrated airbag deployment door 28 and further, helps to control the opening of the integrated airbag deployment door 28 to provide a clean airbag deployment.

Likewise, the base portions 64 of the inserts 58 and 60 are disposed along the back surface 70 of the perimeter flange 46 and the weld features 62 of the inserts 58 and 60 extend through the openings 66 to position the weld features 62 adjacent to and proud of the substrate facing surface 68 of the perimeter flange 46. The weld features 62 of the inserts 58 and 60 are welded, e.g., via vibration welding, ultrasonic welding, or the like, to the back surface 22 of the substrate 11 that surrounds the integrated airbag deployment door 28. As such, the perimeter flange 46 is sandwiched between the base portions 64 of the inserts 58 and 60 and the substrate 11 to operatively couple the perimeter flange 46 to the substrate 11. This arrangement helps to reinforce the portion of the substrate 11 surrounding the opening that is formed when the integrated airbag deployment door 28 separates along the seams 24 and 24a to help control the opening of the integrated airbag door 28 to provide a clean airbag deployment.

As illustrated, the inserts 54, 56, 58, and 60 are formed a PP/TPO material 84 that has a different composition than the TPE material 72. In an exemplary embodiment, the PP/TPO materials 30 and 84 have the same or essentially equivalent compositions. As such, the PP/TPO materials 30 and 84 have similar physical properties including melting point, mechanical properties including flexural modulus, and processing properties including melt flow and welding properties. It has been found that welding of the inserts 54, 56, 58, and 60 (e.g., the weld features 62) to the various areas of the substrate 11 where the inserts 54, 56, 58, and 60 and the substrate 11 are formed from similar PP/TPO materials results in a robust welding process that produces weld joints between the airbag chute-door assembly 14 and the substrate 11 with relatively high weld strength.

Figure 4:
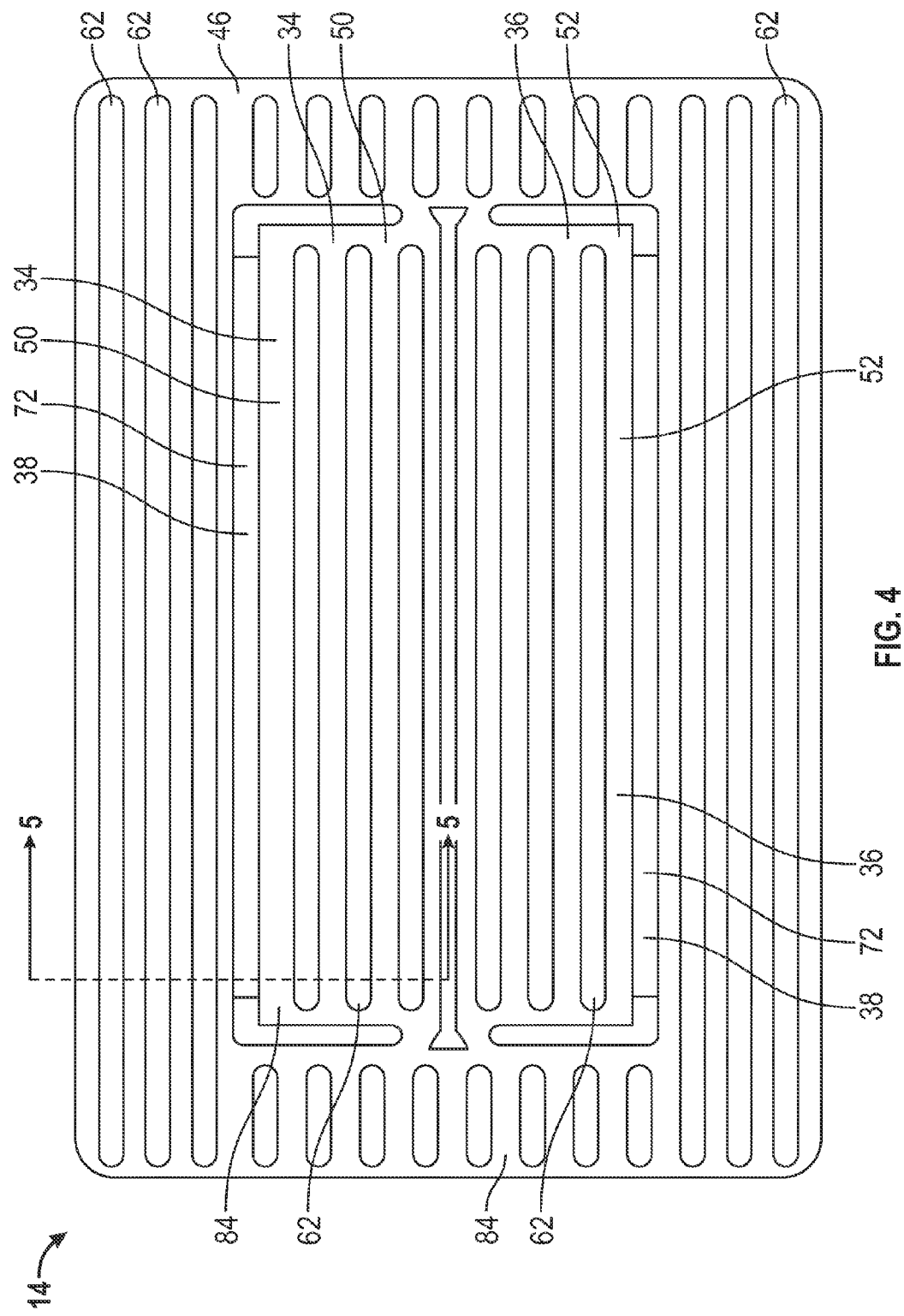
FIG. 4 is a plan view of an airbag chute-door assembly in accordance with an exemplary embodiment.
Figure 5:
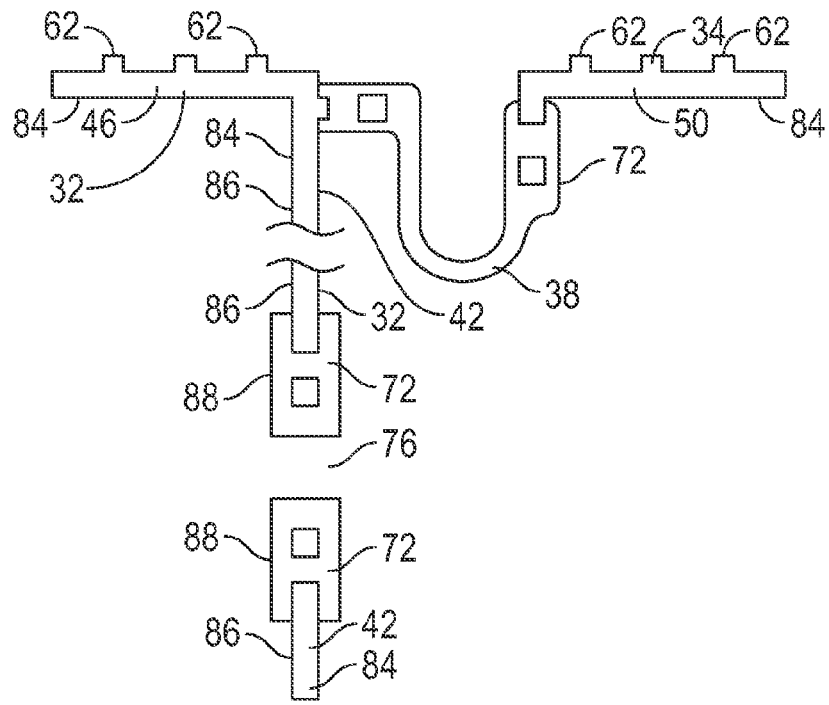
FIG. 5 is a partial sectional view of the airbag chute-door assembly depicted in FIG. 4 along line 5.

Referring to FIGS. 4-5, a plan view and a partial sectional view of the airbag chute-door assembly 14 in accordance with another exemplary embodiment is provided. The airbag chute-door assembly 14 is advantageously constructed using a two-shot or transfer molding process (e.g., over molding process) to selectively formed portions of the airbag chute-door assembly 14 with the PP/TPO material 84 and the TPE material 72. In particular, the TPE material 72 is generally more expensive than the PP/TPO material 84. By selectively forming portions of the airbag chute-door assembly 14 that benefit from the more compliant TPE material 72, and using the lower-cost PP/TPO material 84 to produce the other portions, a lower-cost airbag chute-door assembly 14 can be produced that results in a robust welding process and produces weld joints between the airbag chute-door assembly 14 and the substrate 11 with relatively high weld strength. In an exemplary embodiment and as illustrated, a body portion 86 of the chute wall 42, the door flap sections 50 and 52, and the perimeter flange 46 are formed of the PP/TPO material 84. The weld features 62 are integrally formed with the door flap sections 50 and 52 and the perimeter flange 86 and are also formed of the PP/TPO material 84. The hinges 38 and edge portions 88 of the chute wall 42 surrounding the chute wall openings 76 are formed of the TPE material 72. As such, the hinges 38 formed of the TPE material 72 permits controlled pivotal movement of the door flap sections 50 and 52; and the edge portions 88 of the chute wall 42 formed of the TPE material 72 help to absorb energy and allow some limited movement of the airbag module 16 during airbag deployment. As discussed above, the weld features 62 formed of the PP/TPO material 84 produce weld joints between the airbag chute-door assembly 14 and the substrate 11 with relatively high weld strength.

Figure 6:
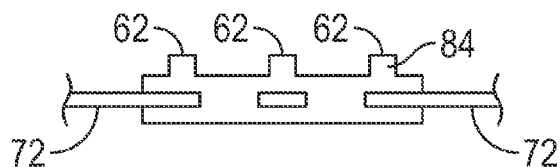
FIG. 6 is a partial sectional view of an airbag chute-door assembly in accordance with an exemplary embodiment.

Alternatively and as illustrated in FIG. 6, instead of integrally forming the weld features 62 with the door flap sections 50 and 52 and/or the perimeter flange 46, the weld features 62 may be separately formed onto the door flap sections 50 and 52 and/or the perimeter flange 46 by selectively overmolding the TPE material 72 with the PP/TPO material 84 to form a PP/TPO insert(s) as one or more of the inserts 54, 56, 58, and/or 60 (illustrated in FIG. 1). In this embodiment, portions of the door flap sections 50 and 52 and/or the perimeter flange 46 can benefit from being formed of the more compliant TPE material 72 while the airbag chute-door assembly 14 can be welded to the substrate 11 with the weld features 62 formed of the PP/TPO material 84, producing weld joints that have relatively high weld strength.

Figure 7:
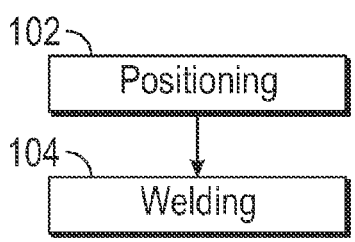
FIG. 7 is a flowchart of a method of making an interior panel having an integrated airbag deployment door for a motor vehicle in accordance with an exemplary embodiment.

Referring to FIG. 7, a flowchart of a method of making an interior panel having an integrated airbag deployment door for a motor vehicle in accordance with an exemplary embodiment is provided. The method 100 comprises positioning (step 102) a chute portion and a first door flap section of an airbag chute-door assembly adjacent to a substrate that comprises a first PP/TPO material. At least one weld feature comprising a second PP/TPO material is welded (step 104) to the substrate to attach the first door flap section to the substrate. The first door flap section is pivotally connected to the chute portion by at least one hinge that comprises a TPE material that has a different composition than the first and second PP/TPO materials. In an exemplary embodiment, the first and second PP/TPO materials have the same or essentially equivalent compositions.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel having an integrated airbag deployment door for a motor vehicle, the interior panel comprising:
   a substrate comprising a first PP/TPO material; and
   an airbag chute-door assembly comprising:
      a chute portion having a chute wall that at least partially surrounds an interior space sized to permit passage of an airbag during deployment;
      a first door flap portion disposed adjacent to the interior space and comprising a first door flap section and at least one first weld feature that comprises a second PP/TPO material and that attaches the first door flap section to the substrate, wherein the first door flap section has a substrate facing surface, a back surface that faces opposite the substrate facing surface, and a plurality of openings formed therethrough extending from the substrate facing surface to the back surface, wherein the first door flap portion comprises an insert that comprises the at least one first weld feature, and wherein the insert is disposed along at least a portion of the back surface and extends through at least one of the openings to position the at least one first weld feature adjacent to the substrate facing surface; and
      a first hinge pivotally connecting the first door flap section to the chute portion and comprising a TPE material that has a different composition than the first and second PP/TPO materials.

2. The interior panel of claim 1, wherein the first and second PP/TPO materials have the same or essentially equivalent compositions.

3. The interior panel of claim 1, wherein the first door flap section comprises the second PP/TPO material and the at least one first weld feature is integrally formed along the first door flap section.

4. The interior panel of claim 1, wherein the first door flap section and/or the chute wall comprise the TPE material.

5. The interior panel of claim 1, wherein the openings are configured as a plurality of juxtaposed slots.

6. The interior panel of claim 1, wherein the airbag chute-door assembly further comprises:
   a second door flap portion disposed adjacent to the interior space and comprising a second door flap section and at least one second weld feature that comprises the second PP/TPO material and that attaches the second door flap section to the substrate; and
   a second hinge pivotally connecting the second door flap section to the chute portion and comprising the TPE material, and wherein the first and second door flap portions are cooperatively configured to define an "H-pattern" door arrangement.

7. The interior panel of claim 6, wherein the second door flap section has an associated substrate facing surface, an associated back surface that faces opposite the associated substrate facing surface, and a plurality of associated openings formed therethrough extending from the associated substrate facing surface to the associated back surface, wherein the second door flap portion further comprises an associated insert that comprises the at least one second weld feature, and wherein the associated insert is disposed along at least a portion of the associated back surface and extends through at least one of the associated openings to position the at least one second weld feature adjacent to the associated substrate facing surface.

8. The interior panel of claim 1, wherein the chute portion comprises:
   a perimeter flange extending from an end portion of the chute wall away from the interior space and adjacent to the substrate; and
   at least one third weld feature that comprises the second PP/TPO material and that attaches the perimeter flange to the substrate.

9. The interior panel of claim 8, wherein the perimeter flange has an associated substrate facing surface, an associated back surface that faces opposite the associated substrate facing surface, and a plurality of associated openings formed therethrough extending from the associated substrate facing surface to the associated back surface, wherein the chute portion further comprises an associated insert that comprises the at least one third weld feature, and wherein the associated insert is disposed along at least a portion of the associated back surface and extends through at least one of the associated openings to position the at least one third weld feature adjacent to the associated substrate facing surface.

10. The interior panel of claim 1, wherein the substrate is scored adjacent to the airbag chute-door assembly forming a seam that defines the integrated airbag deployment door.

11. The interior panel of claim 1, further comprising:
   an airbag module operatively attached to the chute portion to direct the airbag through the interior space towards the substrate during deployment.

12. An interior panel having an integrated airbag deployment door for a motor vehicle, the interior panel comprising:
   a substrate comprising a first PP/TPO material; and
   an airbag chute-door assembly comprising:
   a chute portion having a chute wall that at least partially surrounds an interior space sized to permit passage of an airbag during deployment;
   a first door flap portion disposed adjacent to the interior space and comprising a first door flap section and at least one first weld feature that comprises a second PP/TPO material and that attaches the first door flap section to the substrate; and
   a first hinge pivotally connecting the first door flap section to the chute portion and comprising a TPE material that has a different composition than the first and second PP/TPO materials, wherein the chute wall has a plurality of openings formed therethrough for attaching an airbag module to the chute portion, wherein the chute wall comprises edge portions surrounding the openings and a body portion surrounding the edge portions, and wherein the edge portions comprise the TPE material and the body portion comprises the second PP/TPO material.

13. A method of making an interior panel having an integrated airbag deployment door for a motor vehicle, the method comprising the steps of:
   positioning a chute portion and a first door flap section of an airbag chute-door assembly adjacent to a substrate that comprises a first PP/TPO material; and
   welding at least one weld feature comprising a second PP/TPO material to the substrate to attach the first door flap section to the substrate, wherein the first door flap section is pivotally connected to the chute portion by at least one hinge that comprises a TPE material that has a different composition than the first and second PP/TPO materials, wherein the first door flap section has a substrate facing surface, a back surface that faces opposite the substrate facing surface, and a plurality of openings formed therethrough extending from the substrate facing surface to the back surface, wherein the first door flap portion comprises an insert that comprises the at least one weld feature, and wherein the insert is disposed along at least a portion of the back surface and extends through at least one of the openings to position the at least one weld feature adjacent to the substrate facing surface.

\* \* \* \* \*